United States Patent
Poyntz

(10) Patent No.: US 10,160,297 B2
(45) Date of Patent: Dec. 25, 2018

(54) RETRACTABLE TRAILER ENCLOSURE SYSTEM

(71) Applicant: Philip Poyntz, Sutton (CA)

(72) Inventor: Philip Poyntz, Sutton (CA)

( * ) Notice: Subject to any disclaimer, the term of this patent is extended or adjusted under 35 U.S.C. 154(b) by 0 days.

(21) Appl. No.: 15/231,983

(22) Filed: Aug. 9, 2016

(65) Prior Publication Data

US 2017/0043652 A1    Feb. 16, 2017

Related U.S. Application Data

(60) Provisional application No. 62/203,517, filed on Aug. 11, 2015.

(51) Int. Cl.
*B60J 7/06*    (2006.01)
*B60J 5/06*    (2006.01)

(52) U.S. Cl.
CPC .............. *B60J 7/067* (2013.01); *B60J 5/067* (2013.01)

(58) Field of Classification Search
CPC ................................. B60J 7/067; B60J 5/067
USPC .......................................................... 296/98
See application file for complete search history.

(56) References Cited

U.S. PATENT DOCUMENTS

| | | | |
|---|---|---|---|
| 473,292 A | 4/1892 | Campbell | |
| 2,976,082 A | 3/1961 | Dahlman | |
| RE31,746 E | 11/1984 | Dimmer | |
| 4,484,777 A | 11/1984 | Michel | |
| 4,834,445 A | 5/1989 | Odegaard | |
| 5,002,328 A | 3/1991 | Michel | |
| 5,152,575 A | 10/1992 | DeMonte et al. | |
| 5,303,972 A | 4/1994 | Heider et al. | |
| 5,328,228 A | 7/1994 | Klassen | |
| 5,466,030 A | 11/1995 | Harris | |
| 5,658,037 A | 8/1997 | Evans | |
| 5,765,901 A | 6/1998 | Wilkens | |
| 6,199,935 B1 | 3/2001 | Waltz et al. | |
| 6,206,449 B1 | 3/2001 | Searfoss | |
| 6,513,856 B1 | 2/2003 | Swanson et al. | |
| 6,527,331 B2 | 3/2003 | Searfoss | |
| 6,641,199 B1 | 11/2003 | Hicks | |
| 6,779,828 B1 | 8/2004 | Poyntz | |
| 6,783,168 B2 | 8/2004 | Searfoss | |
| 6,783,312 B2 | 8/2004 | Smith | |

(Continued)

FOREIGN PATENT DOCUMENTS

| EP | 1 070 617 | 1/2001 |
|---|---|---|
| GB | 2041839 | 9/1980 |

(Continued)

OTHER PUBLICATIONS

Truck and Trailer, Aug. 2002, p. 3.

(Continued)

*Primary Examiner* — Joseph D. Pape
*Assistant Examiner* — Dana D Ivey

(57) ABSTRACT

A retractable trailer enclosure system includes a flexible cover, rotatable winding spindle moveable by way of a spindle guide assembly. The spindle guide assembly includes a drive assembly actuable to rotate the spindle, a shuttle assembly mounting a spindle end and a guide track assembly which guides the shuttle assembly in reciprocal movement along both a vertical cover deployment/retraction path, and laterally along a spindle storage path.

2 Claims, 9 Drawing Sheets

(56) References Cited

U.S. PATENT DOCUMENTS

| | | | |
|---|---|---|---|
| 6,805,935 B2 | 10/2004 | Ashida et al. | |
| 6,811,202 B2 | 11/2004 | Hornady | |
| 6,926,337 B2 | 8/2005 | Poyntz | |
| 7,703,833 B2 * | 4/2010 | Petelka | B60J 7/085 296/98 |
| 8,226,150 B1 * | 7/2012 | Schmeichel | B60P 7/04 296/100.15 |
| 2002/0021018 A1 | 2/2002 | Royer | |
| 2003/0090124 A1 | 5/2003 | Nolan et al. | |
| 2004/0150244 A1 | 8/2004 | Eggers et al. | |
| 2004/0189038 A1 | 9/2004 | Nolan et al. | |
| 2004/0201240 A1 | 10/2004 | Corbett | |
| 2004/0217622 A1 | 11/2004 | Talbot | |

FOREIGN PATENT DOCUMENTS

| | | |
|---|---|---|
| GB | 2066746 | 7/1981 |
| GB | 2084241 | 4/1982 |
| GB | 2236290 | 4/1991 |
| JP | 353093520 | 8/1978 |

OTHER PUBLICATIONS

Truck and Trailer, Apr. 2002, vol. 16, No. 4, 1 page.
Truck and Trailer, Sep. 2002, p. 10—Roll-Tite.
Truck and Trailer, Aug. 2002, p. 31.
Truck and Trailer, Aug. 2002, vol. 16, No. 8—Roll-Tite, 1 page.
Truck and and Trailer, Oct. 2002, p. 27.
Roll-Rite, 2001 brochure, pp. 6 to 9.
Shurco 2002 Tarps Catalog, pp. 16 to 41.
Cramaro Tarpaulin systems—Tarp—All Brochure, 4 pages.
Cramaro Tarpaulin Systems—Deluxe Side Kits Brochure, 2 pages.

* cited by examiner

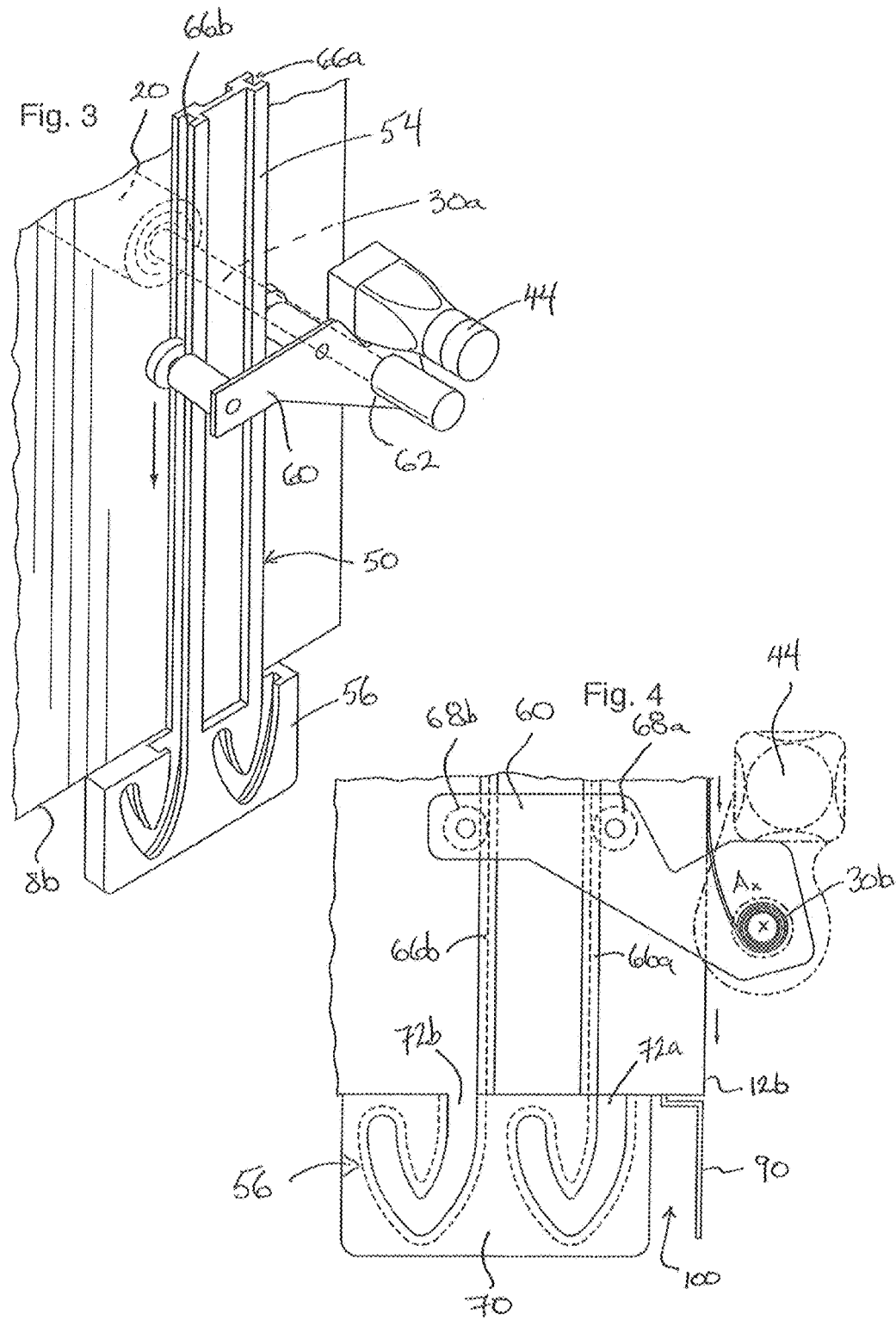

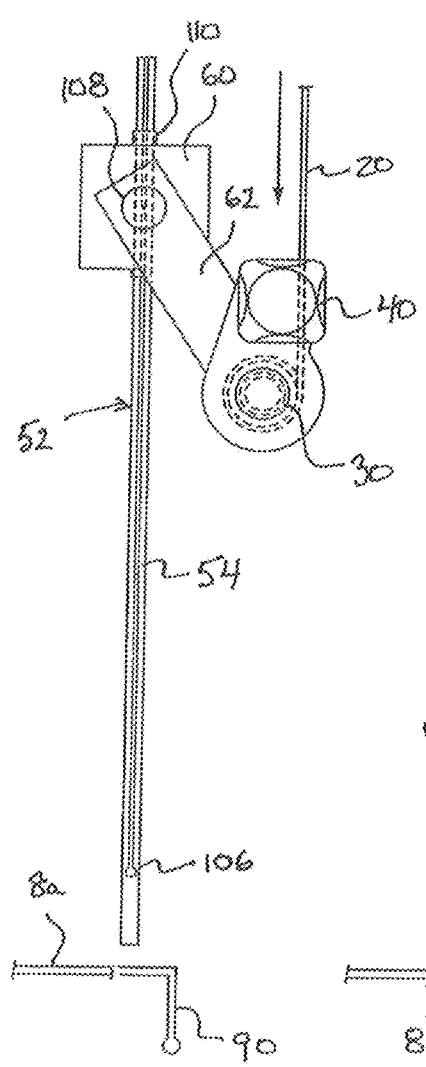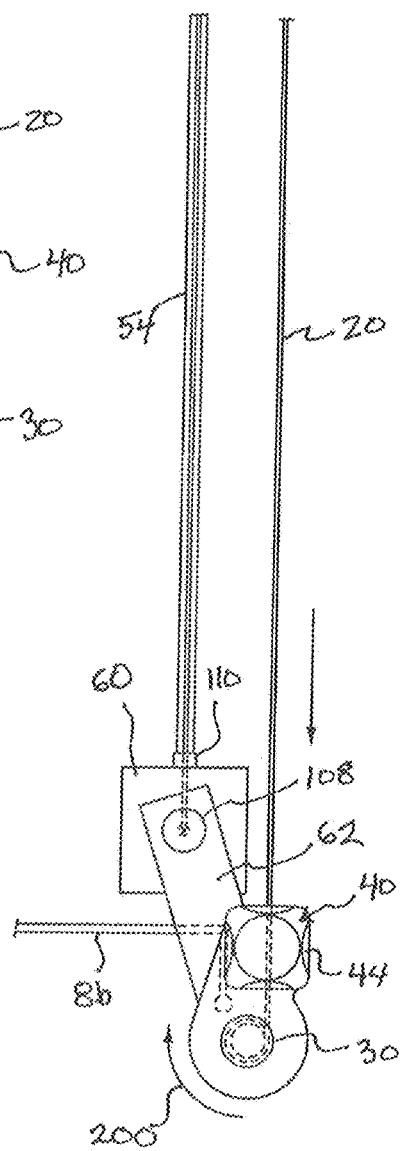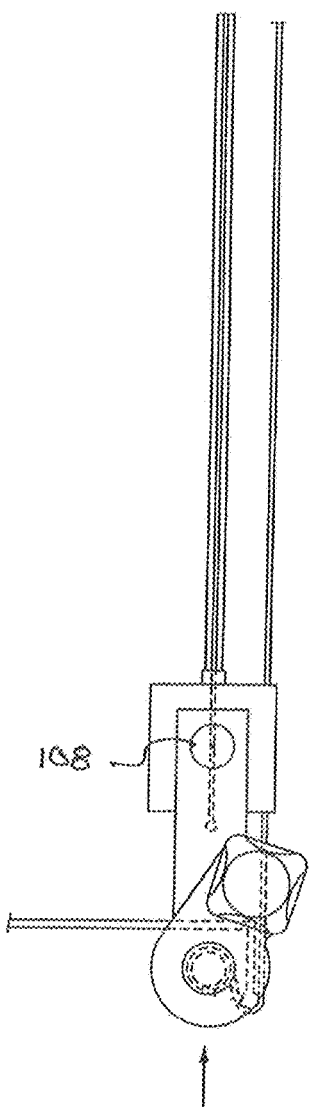

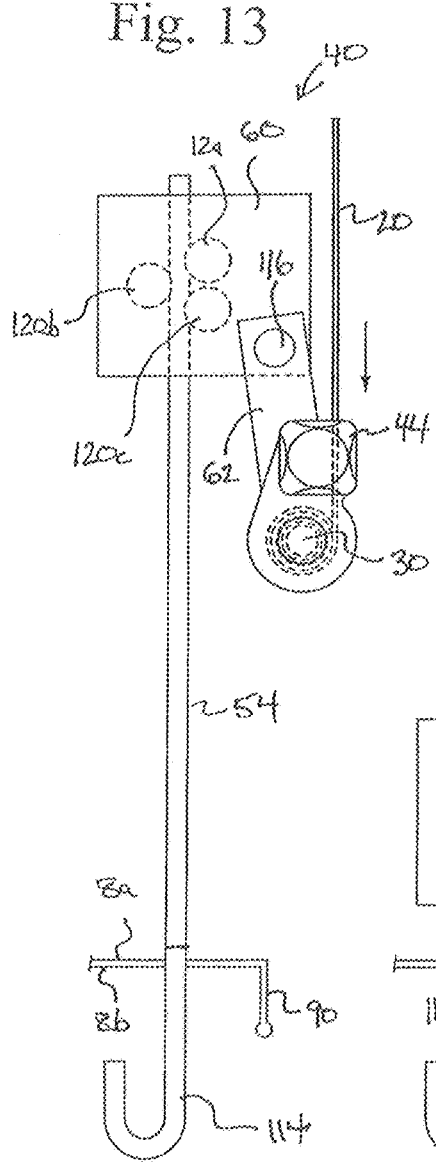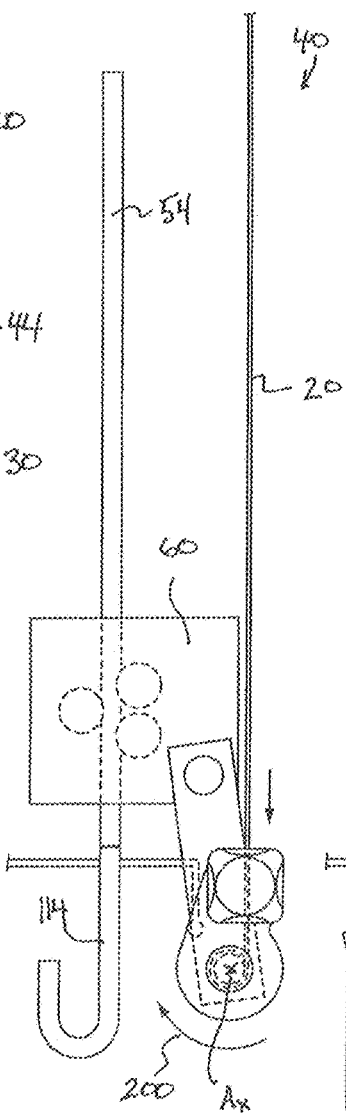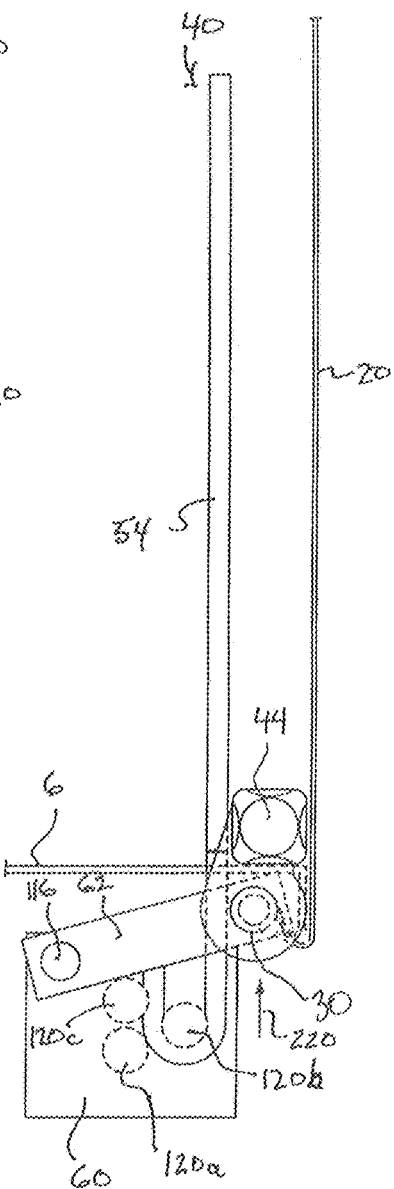

RETRACTABLE TRAILER ENCLOSURE SYSTEM

RELATED APPLICATIONS

This application claims priority and the benefit of 35 U.S.C. § 119(e) to U.S. Patent Application Ser. No. 62/203,517, filed 11 Aug. 2015, which is incorporated herein by reference in its entirety.

SCOPE OF THE INVENTION

The present invention relates to a tarpaulin or tarp enclosure system used for covering a bed surface of a trailer, such as a wheeled truck bed or railcar, and more particularly a tarp enclosure system which may be extended or retracted from a remote location by a user standing on the ground to permit access to the trailer bed along one or each lateral side.

BACKGROUND OF THE INVENTION

In the trucking and transportation industries, the use of wheeled flatbed trailers to ship goods is commonly known. To both protect the goods which are being shipped and contain debris therefrom, various trailer enclosure systems have been proposed which are extendable over part or all of the trailer bed. Typically trailer enclosure systems comprise a flexible cover or tarp which when deployed is suspended above the upper surface of the trailer bed by way of a series of metal bows or other support frame. Conventionally, the edges of the cover are secured along the sides of the trailer bed by ratchet straps or cables to maintain the cover in place during transportation.

The applicant's earlier Canadian Patent No. 2,460,703, issued 20 May 2008, which is incorporated herein by reference in its entirety, describes a retractable truck tarpaulin system which incorporates pivot arm-mounted rotatable winding spindles. An edge portion of the covering tarpaulin secured to the spindle is coiled or wound thereabout to permit access to the trailer along each longitudinal side. The applicant has appreciated that, depending upon the trailer configuration, pivot arms may be susceptible to damage where, for example, the trailer is provided with a trailer-mounted forklift. In particular, as the system described in Canadian Patent No. 2,460,703 operates to retract or deploy the tarpaulin by winding or unwinding the spindle as the pivot rods rotate, the spindle arm may be bent or damaged on being struck by the forklift as it is driven into the forklift mounting at the trailer end.

In addition, the use of forward pivot arms may interfere with the trailer cab exhaust, particularly on straight or non-articulating tucks.

SUMMARY OF THE INVENTION

An object of the present invention is to provide a retractable trailer enclosure system for use in covering at least part of the upper surface of a trailer bed such as used with a truck or railcar trailer.

Another object of the invention is to provide a retractable trailer enclosure system which includes a flexible tarp, tarpaulin, webbing, strappings or a cover, (hereinafter generally referred to as a cover) which may be selectively vertically and/or horizontally retracted or extended so as to expose or cover the upper surface of a truck or train trailer bed by a user standing beside the trailer or from another remote location.

Another non-limiting object of the invention is to provide a retractable trailer enclosure system which includes a flexible cover which when extended over the trailer bed, is adapted to provide a substantially fluid sealing arrangement between the cover edges and the sides or ends of the trailer bed.

A further non-limiting object of the invention is to provide a retractable trailer enclosure system which may be vertically retracted along one or both longitudinal sides of a flat truck or railcar trailer, so as to permit the loading or unloading of goods thereon by a conventional fork lift, tractor, crane or the like.

To achieve at least some of the aforementioned objects, the present invention provides a retractable trailer enclosure system for use in covering at least part of the bed of a non-articulating truck bed, an articulating truck trailer, railcar trailer or the like (hereinafter collectively referred to as a "trailer"). Typically, the trailer is a wheeled trailer having a generally flat horizontally extending trailer bed characterized by parallel and longitudinally elongated sides, lateral front and rear ends, and a generally flat upper and lower surfaces.

To address at least some of the disadvantages associated with prior art retractable truck tarpaulin systems and/or achieve some of the foregoing objects, the present invention provides a retractable trailer enclosure system in which a rotatable winding spindle which is moveable by way of a spindle guide assembly. The system includes a flexible cover, the elongated winding spindle being adapted to permit the winding of an edge portion of the cover thereabout, and a spindle guide assembly. The spindle guide assembly is operable to support and guide the spindle as it is rotated to raise and lower the edge portion of the cover over trailer side and/or end. The spindle guide assembly includes a drive assembly which is selectively actuable to journal the spindle in rotation to effect winding or unwinding of the cover, at least one shuttle assembly used to mount at least one respective spindle end, and at least one guide assembly or track which guides the shuttle assembly in reciprocal movement along both a vertical cover deployment/retraction path, and along a generally lateral spindle storage path.

More preferably, the guide track includes a vertical guide portion for guiding the along the path of vertical movement as the cover is wound or unwound thereabout in its retraction and deployment. As will be described, in a simplified construction, the vertical guide portion may be provided as a rigid guide rail or extruded channel along which the shuttle assembly is moved.

The guide track is preferably provided with a lateral displacement assembly which, on engagement by the shuttle assembly, as the cover is fully deployed, effects the lateral displacement of the spindle to a storage position moved against the trailer bed. Preferably, the lateral displacement assembly is positioned toward a lower end of the vertical guide portion and which is configured to displace the spindle to a storage position under a portion of the trailer when engaged by the shuttle assembly. The applicant has appreciated that by mounting the spindle to a shuttle assembly moveable along the guide track, the trailer enclosure system may be readily customized for use with a variety of transport trailers having differing configurations and sizes.

The extended flexible cover is typically supported above the transported goods by way of a trailer cover support, so as to prevent rain, snow and/or wind damage to the goods, as well as preventing debris from blowing off of the trailer during transportation. The cover support may be in the form of fixed or removable hoops or bows which extend a distance over the upper surface of the trailer bed. Alternately, when deployed the cover may be supported above the trailer bed at its edges by way of permanently mounted trailer headboards or bulkheads and/or along its mid-portion by one or more longitudinally extending support rails.

In operation, the cover may be retracted by its winding about the spindle to expose and permit access to the trailer bed surface along one or preferably both trailer sides. Unwinding the cover from the spindle extends the cover over the trailer bed together with any goods which are positioned thereon for transport.

One, and more preferably two, elongated spindles are provided which are mounted to a respective trailer side by means of an associated spindle guide assembly. As will be described, the selective rotation of the spindle by the drive assembly is used to wind the cover, coiling or uncoiling it thereabout in its retraction or deployment. The cover, when extended, preferably has a size selected to permit it to be stretched over a longitudinal side of the trailer, with one longitudinal cover edge portion secured to the spindle. The spindle is elongated along its longitudinally elongated axis, and although not essential, preferably has a length generally corresponding to the length of the portion of the trailer bed to be covered. More preferably, the spindle and cover each have a longitudinal length corresponding to that of the longitudinal length of the trailer sides.

Although not essential, most preferably, each end of the spindle is movably supported in an orientation with its spindle axis generally parallel to the upper surface of the trailer bed by a spindle guide assembly. In a more economical construction, a second drive assembly may be omitted and a single drive assembly may be provided to journal each spindle in rotary movement. For heavier or larger covers, however, a separate drive assembly may be provided in the spindle guide assembly at each spindle end. In such a construction, the system may further optionally include a self-leveling controller for regulating both drive assemblies to maintain the spindle in a desired orientation relative to the trailer bed as it is retracted or deployed.

The spindle guide assembly is used to moveably support and guide the spindle in a winding position, generally parallel and adjacent to a longitudinal side of the trailer bed as it winds or unwinds the cover, with the shuttle assembly used to mount the spindle and preferably also the spindle drive. A manual, electric or other power drive is used to selectively rotate the spindle to thereby extend or retract the cover. When the cover is in an initial storage position covering the trailer bed, the initial rotation of the spindle about its spindle axis results in the winding of the cover about the spindle. As the cover is coiled about the spindle, the spindle is drawn from the storage position by advancing along the cover. In this manner, the cover may be retracted to expose the trailer bed simply by having it coil about the spindle upon its rotation. In a similar manner by reversing the direction of rotation of the spindle, the tarp is unwound to recover the trailer bed. Preferably, however, an electric drive motor is provided to drive the spindle, and more preferably, a 12V/or 24V electric motor with an extra brake. To stop spindle "creep", a brake located on the top of motor is preferably engaged when there is an interruption in power. The motor is used to wind and unwind via a toggle switch or a commercial remote control system via a key fob on off control system, the brake will automatically lock or engage when power is disconnected. The motor is ideally direct drive but other methods of rotating the spindle may be used. The drive motor is most preferably a drive as set out in U.S. Pat. No. 5,829,819 to issue to Searfoss. The system most preferably has a brake. Although a motor may have gear reduction which acts, in a way, as a stop, a true brake is preferably provided to stop tarp creep or a loosening of the tarp. Therefore, the present invention ideally utilizes a direct drive with a brake, and more ideally the direct drive as set out in U.S. Pat. No. 5,829,819, when moving a truck tarpaulin from bottom to top or top to bottom along a generally vertical line.

The drive system is preferably located as part of the spindle guide assembly provided on the front trailer bulkhead, but is not limited thereto. When used on flat decks where space between the front bulkhead and back of cab is limited, ideally the drive mechanism is then located on the back. Such configurations also work well when used on trailer B trains, and where pinch points eliminate space between the two trailers.

The shuttle assembly preferably includes a spindle mounting bracket or carriage which directly or indirectly by way of a support arm supports the spindle and moveably engages with the guide track. The vertical guide portion of the guide track may include a guide track, rib or rod which extends vertically and, optionally in some embodiments, horizontally above the trailer bed. As the spindle is turned to wind or unwind the cover, the spindle shuttle assembly moves vertically along the track of vertical guide portions so as to extend or retract the cover. When the cover is being deployed or extended gravity pulls the carriage down along the vertical guide portion as the cover is unraveled. When the cover is being retracted, the winding tension in the cover pulls the carriage upwardly along the vertical guide portion of the guide track to expose the upper surface of the trailer bed.

Preferably, the spindle guide assembly operates to guide the spindle beneath an edge portion the trailer bed so as to create a seal between the cover and the side of the trailer bed. More preferably, the trailer bed may be provided with a flange which extends downwardly below the trailer bed along at least one and preferably each trailer side. Alternately the flange may extend outwardly and downwardly relative to the top surface of the trailer bed. The flange forms in part a pocket or recess sized to receive the spindle for forming a seal with the cover when it is fully extended. In some embodiments, the flange extends along the full length of the lateral edge of the trailer bed. In other embodiments the flange only runs along parts of the lateral edge of the trailer bed. In places where there is no flange, straps for securing the cargo may more easily pass between the cover and the sides of the trailer.

Preferably, the lateral displacement assembly is spaced towards the lower end of the vertical guide portion. The lateral displacement assembly is engageable by the shuttle assembly as the spindle is lowered towards full deployment and is positioned below the upper surface of the truck bed. The lateral displacement assembly is configured so that when engaged, continual rotation of the spindle results in its deflection or displacement to a storage position moved beneath the bed, and most preferably into the pocket or recess formed by the flange.

In one simplified construction, the displacement assembly may include a stop member for limiting downward vertical movement of the carriage. The stop member is co-operable with a pivot bearing and more preferably a Rosta™ bearing. The bearing is used to connect the spindle mounting arm to the carriage, and which with continued unwinding, allows for rotational movement of the spindle about the bearing from the winding position, where the spindle locates laterally outward relative to the bed side so as to be vertically moveable, to the storage position moved below the edge portion of the bed.

As will be described, in alternate possible embodiments, the displacement assembly may be provided with a generally U or J-shaped track which is engageable by the shuttle assembly to reposition the spindle laterally between winding and storage positions. Alternately, the displacement assembly could further include an L-shaped or angled track. The track preferably runs from the top of at least one bulkhead in close proximity to its lateral edge to near the trailer bed. The track may be provided with a grooved channel or path which runs along its length and which curves or ends at a pivot point near the trailer bed. A spindle carriage is provided with a connecting pin, wheel or bearing which is designed to slideably engage with the grooved path and coupled against removal therefrom, allowing the carriage slide along the grooved path. A spindle is rotatably coupled to the carriage so as to allow the spindle to rotate as the cover is wound or unwound. A power drive is mounted to the carriage and is operable to journal the spindle in rotation in order to wind or unwind the cover. When the spindle is rotated such that the cover wraps around the spindle, the tension in the cover causes the carriage to slide upwards along the grooved path. When the cover is fully retracted the spindle preferably sits at or near the top of the trailer bed compartment.

To re-extend the cover the power drive rotates the spindle in the opposite direction. As the cover unfurls the force of gravity causes the carriage to slide back down the grooved path. When the connecting pin or bearing reaches the pivot point at the end of the grooved path the spindle locates beneath the trailer bed, and preferably below a sealing flange extending down vertically from the trailer bed side, with the cover fully uncoiled from the spindle. The power drive continues to rotate the spindle in the same direction, causing the cover to wrap around the spindle in the opposite orientation. The tension in the cover causes the carriage to displace laterally and/or pivot around the pivot point, whereby the spindle moves under and around the flange to create a seal between the cover and the trailer bed side. In order to retract the cover, the process is reversed, whereby as the cover uncoils, gravity pulls the spindle out from under the trailer bed and flange. Continued winding in the opposite orientation provides tension which pulls the spindle up, and causes the carriage to move or pivot back to its original winding orientation.

The trailer is preferably provided with front and rear bulkheads, each consisting of a vertical panel spanning across the front and rear lateral ends of the trailer. The bulkheads may be formed of metal and/or wood having a square or generally rectangular shape. The bulkheads, although not essential, provide additional safety and assist in preventing a load from shifting in the front to back direction as the truck or railcar brakes. Although not essential, it is most preferable that the tarp enclosure system includes a pair of elongated spindles, each mounted to an associated spindle guide assembly and secured to a respective longitudinal edge of the cover. Such a construction advantageously permits access to either side of the truck trailer bed.

In one embodiment, the carriage includes a pair of guide wheels, bearings or other connector ribs or pins mounted horizontally on a plate. In such an embodiment, the guide rail comprises a vertical track section which includes a pair or parallel channels or grooves running vertically along lateral sides or mid-portions of the track. The connector pins have connector ends that are ridged so as to engage with the grooves in the track section. The horizontal width of the track section corresponds to the horizontal distance between the connector pins such that the connector pins are securely attached to the track section. As the spindle winds or unwinds the connector pins move along the grooves in the track section guiding the spindle as it moves over the trailer bed compartment.

In one preferred embodiment, the guide track assembly includes as part of the lateral displacement assembly, a guide plate at the bottom of the track section. The guide plate has at least one, and preferably two grooved paths that connect with and more preferably are contiguous with the grooves in the vertical track section, so that the guide wheels, bearings and connector pins can securely travel between the vertical guide portion and track section of the guide plate.

In a preferred construction, the grooved paths have a hook, U-shape or J-shape, with each path beginning vertically aligned with the grooves in the adjacent track section vertical guide portion, and then curving horizontally toward the centre of the trailer bed. Preferably, the grooved paths curve back upwardly towards a vertical orientation. When engaged by the guide wheels or other connector pins on the carriage, as the spindle is unwound the carriage thus moves in translational movement to move the spindle initially downward below the lower edge of the trailer or rib. Continued winding of the cover rewinds the cover to draw the spindle laterally inward and upwardly from the winding position, to relocate the spindle in the storage position.

The grooved paths of the guide plate allow the spindle to reliably move under the trailer bed pulling the cover against the trailer sides in order to create a seal between the cover and the lateral edge of the trailer bed. Preferably, the spindle moves under the flange and back up on the inner side of the flange, creating a labyrinth-type seal between the cover and the flange.

In another embodiment, the guide track assembly may include a T-shaped rail or tubular rod, extending generally vertically from the trailer bed, and optionally which at an upper end curves horizontally to run at least partially along the top of the trailer bed compartment.

In an alternate construction, the shuttle assembly may include a carriage which has a guide bushing or slide, which for example may include a low friction slide bearing. Alternately one, preferably at least two, and more preferably three or more, guide connecting wheels may be provided. The connecting wheels are rotatably connected to the carriage and are arranged so as to securely engage with edges of a channel recess or tubular rod. Preferably, a first connecting wheel is positioned to engage the tubular rod on one side, a second connecting wheel positioned below the first connecting wheel so as to engage the tubular rod on the other side, and a third connecting wheel positioned below the second connecting wheel so as to engage the tubular rod on the one side. As the spindle winds or unwinds, the carriage slides along the tubular rod and guides the spindle over the trailer bed.

The lower end of the guide track assembly is provided with a curving bottom section as part of the lateral displacement assembly. When engaged, the curving bottom section imparts a rotary movement to reposition the spindle under the lateral edge of the trailer bed. This allows the spindle to move under the trailer bed to form a seal between the cover and lateral edge of the trailer when the cover is fully extended. Although not essential, a rail or tubular rod preferably curves back up towards the vertical orientation in an "L", "J" or "U" shape, with a flange extending vertically downwards from the lateral edge of the trailer bed providing a recess or pocket. This allows the spindle to be guided under the flange and back up on the inside of the flange, creating a labyrinth-type seal between the cover and the flange.

In another embodiment the vertical guide portion of the guide track assembly comprises a track section which runs generally vertically along the side of the trailer bed compartment. The track section includes a grooved path running vertically upwards from a shuttle stop near the bottom of the track section. The shuttle assembly further includes a spindle mounting bracket or arm pivotally coupled to the carriage at a pivot bearing. The carriage includes one or more rigid connecting pins or guide wheels which engage with the grooved paths on a vertically extending track portion or rail such that in the winding position the spindle is guided vertically along the track section as it winds or unwinds. During the unwinding of the spindle, when the spindle moves to or below the lateral edge of the trailer bed, the force of the unwinding causes the spindle mounting arm to rotate about the pivot bearing and reposition the spindle under the side of the trailer bed. This creates a seal between the cover and the lateral edge of the trailer. When the spindle is rewound, the force of the winding causes the spindle mounting bracket to pivot back to its original orientation, moving the spindle out from under the trailer bed.

In another embodiment the shuttle assembly may further comprise at least one connecting wheel engageable with channels formed within guide tracks mounted along the edge portions of each bulkhead. Preferably, the track section channels have vertically extending portions, and lower curved displacement portions which curve toward the center of the trailer bed when the spindle is below the trailer bed. As the connecting wheels run along the curved part of the track the spindle is guided under the trailer bed and, preferably, under and around a flange so to create a labyrinth-type seal between the cover and the flange.

In a preferred embodiment of the invention the vertical guide rail serves a dual purpose. The first is to provide an anti-torque shaft guide or track for the motor and spindle. With nothing holding the drive to selectively rotate the spindle mechanism for the spindle it would simply "clock" its way around the spindle. The second is that it forms a guide or a track for the tarp to follow as it climbs and descends from its open to close position and vice versa.

The shuttle assembly and torque rod may thus follow a generally vertical path and can vary depending on application. In one embodiment the inventor's guide track assembly starts at 102 inches on the bottom and ends at 96 inches at the top. On a cube trailer the guide track starts at 102 inches and ends at 102 inches, but at the bottom and underneath the trailer allows the path to change and allows spindle (drive and roller tube) to move over (inward) and up allowing the cover and spindle to seal and tighten under the deck.

The spindle storage recess or pocket may run the full length of the trailer for ease of construction, or may be many individual pieces thus allowing the trailer operator the ability to feed cargo straps without interference by the flange, thus allowing for additional straps over the transported goods for tightening and load securement.

The cover may also have cargo straps sewn in or electronically welded (heat) therein. For example, a turf grass customer may call for 2" wide straps over the skid thus at 24" intervals there would be a strap from front to back. This has two points in that it meets or exceeds the requirements of government regulators plus gives the tarp vertical strength. In extreme conditions additional straps may be applied longitudinally to give the same desired effect.

Alternatively, the trailer enclosure system may also be used to deploy individual load retention straps or strips with or without the use of a backing material (mesh/fabric/canvas). For example, with fruits and vegetables, products are harvested and transported in "totes". These may be flexible bags as in fertilizer or soil totes, wood as in carrot or apple bins or extruded plastic bins that interlock such as celery or soft fruit. In many instances the tarp has the main objective to fill the requirements of the transportation industry that it "does not leak spill or blow". Depending on the selected cargo, straps may act so as to satisfy the containment requirements. For example, in the transport of apples totes are placed on the trailer for transportation to market, and are "nesting totes" that will not leak spill or blow but the actual bins may fall. Thus the present system may be used to secure the bins by simply deploying a series of parallel straps as the required cover. This system would unwrap and wrap the appropriate cargo strap with the appropriate physical strength to meet industry requirements.

An optional mechanical lock may be applied to the spindle when it is moved into storage position in the pocket as an added restraint. Such a locking system would be to provide further containment of the spindle in the event of an accident (undue G forces), and may be in the form of a latch system/mechanical dog system provided at any point along the spindle length.

In another embodiment a spindle may be provided which runs from the top to the bottom of the bulkhead. In such a construction, the carriage may consist of two pieces, with a back plate (closest to the bulkhead) having bearings to guide the spindle loosely as it goes up and down and a second piece overlaying the first. The carriage may be laser cut to hold the spindle drive or motor, and a bolt hole to bind the two pieces together and act as the pivot point. An arc shaped slot will prevent travel to the left and right. It will have a roll pin pushed into the back plate and it will provide a guide as well as a stop.

Accordingly, in one aspect the present invention resides in a retractable trailer enclosure system for covering at least part of a vehicle trailer bed, the vehicle bed having longitudinally extending bed side portions and laterally extending ends, at least one trailer bulkhead positioned proximate to an associated trailer end, and a cover support spaced vertically a distance about an upper surface of the bed, the system including, a flexible cover having a longitudinal length substantially corresponding to a longitudinal length an associated said bed side portion, and a width selected whereby with the cover in a fully extended orientation supported by the at least one cover support, the cover extends vertically downwardly to cover the upper surface of the bed along the associated bed side portion with a lower side edge portion of the cover extending below a bottom edge portion of the bed, an elongated, axially extending spindle having a length generally corresponding to the longitudinal length of the associated bed side portion, the lower side edge portion of the cover being coupled to the spindle, a spindle guide assembly for supporting the spindle in a substantially horizontal orientation generally parallel to the longitudinal length of the associated bed side portion, the spindle guide assembly including, a drive assembly coupled to the spindle and selectively activatable to journal the spindle in rotational movement about the spindle axis to effect winding or unwinding of at least part of the cover thereabout, a shuttle assembly mounting the drive assembly and spindle in the retraction and extension of the cover over the associated bed side portion as the drive assembly is actuated to rotate the spindle, the shuttle assembly including a movable carriage and a spindle support coupled to the carriage for movement therewith, the spindle support rotatably supporting the spindle between a winding position, wherein said spindle is located laterally outward relative to said associated bed side so as to be moveable to a vertically spaced position above the bed, and a storage position wherein said spindle is moved laterally inwardly locate beneath at least part of the bed, a guide track mounting the shuttle assembly for movement relative to said trailer bed and being coupled an associated said bulkhead, the guide track including, a vertically extending guide rail portion which extends from a lower end spaced towards the upper surface of the bed, to an upper end spaced a vertical distance thereabove, the carriage being moveable vertically along the vertically extending guide rail portion between the upper and lower ends, a lateral displacement assembly spaced towards said lower end, the displacement assembly being engageable by the shuttle assembly as the carriage is moved towards the lower end, wherein engagement between the shuttle assembly and the displacement assembly effects a lateral displacement of the spindle support to move the spindle between the winding position and the storage position, wherein the rotation of the spindle by the activation of the drive assembly to wind and retract the cover over the associated bed side portion moves the shuttle along the guide track from engagement with the displacement assembly and along the vertically extending guide rail portion to move the spindle from the storage position to the winding position and to a raised orientation with the shuttle assembly spaced towards the upper end, and whereby rotation of the spindle by the activation of the drive assembly to unwind and deploy the cover over the associated bed side portion is operable to move the spindle from the raised orientation whereby the shuttle assembly moves downwardly along the vertically extending guide rail portion and into re-engagement with the displacement assembly to reposition the spindle from the winding position to the storage position.

In another aspect the present invention resides in a retractable enclosure system for covering a side portion of a vehicle trailer bed, the vehicle trailer bed having upper and lower surfaces and including longitudinally extending bed sides and laterally extending ends, a cover support spaced vertically a distance about the upper surface of the bed, and an associated trailer bulkhead positioned proximate to each end, the system including, a flexible cover having a longitudinal length substantially corresponding to a longitudinal length an associated bed side, and a width selected whereby with the cover in a fully extended orientation supported by the cover support, the cover extends vertically downwardly to cover the upper surface of the bed along the associated bed side with a lower side edge portion of the cover extending below the lower surface of the bed, an elongated, axially extending spindle having a length generally corresponding to the longitudinal length of the associated bed side, the lower side edge portion of the cover being coupled to the spindle, a spindle guide assembly for supporting the spindle in a substantially horizontal orientation generally parallel to the longitudinal length of the associated bed side, the spindle guide assembly including, a drive assembly being coupled to the spindle and selectively activatable to journal the spindle in rotational movement about the spindle axis to effect winding or unwinding of at least part of the cover thereabout, a shuttle assembly mounting the drive assembly and spindle in the retraction and extension of the cover over the associated bed side with rotation of the spindle by the drive assembly, the shuttle assembly including a carriage and a spindle support coupled to the carriage for movement therewith, the spindle support supporting the spindle in movement between winding position, wherein said spindle is located laterally outward relative to said associated bed side so as to be moveable to a vertically spaced position above the bed, and a storage position wherein said spindle is moved laterally inwardly and beneath the associated bed side, a guide track assembly moveably mounting the shuttle assembly, the guide track coupled to an associated said bulkhead and including, a vertical guide rail extending from a lower end spaced towards the upper surface, to an upper end spaced a vertical distance thereabove, and a generally positioning track spaced towards the lower end, the positioning track being co-operable with the shuttle assembly and wherein engagement between the shuttle assembly and the positioning track effects selective lateral displacement of the spindle between the winding position and the storage position, the spindle being rotatable by the activation of the drive assembly to wind and retract the cover over the associated bed side to move the shuttle assembly from engagement with the positioning track and along the vertical guide rail relocating the spindle from the storage position to the winding position, and wherein winding of the cover about the spindle moves the shuttle assembly to the upper end to permit side access to trailer bed, and rotation of the spindle by the activation of the drive assembly to unwind and deploy the cover over the associated bed side moves the spindle from the raised position whereby the shuttle assembly moves downwardly along the vertical guide rail and into re-engagement with the positioning track to reposition the spindle in the storage position.

In a further aspect the present invention resides in a vehicle trailer comprising a wheel mounted trailer bed and a retractable trailer enclosure system for selectively covering or uncovering part of the trailer bed, the trailer bed having upper and lower surfaces and including longitudinally extending bed sides and laterally extending bed ends, a trailer bulkhead positioned proximate to each trailer end, the enclosure system comprising, a cover support spaced vertically a distance about an upper surface of the bed, a flexible cover having a longitudinal length substantially corresponding to a longitudinal length of the bed sides, and a width selected whereby with the cover in a fully extended orientation supported by the at least one cover support, the cover extends vertically downwardly to cover the upper surface of the bed sides with lower side edge portions of the cover extending beneath the lower surface of the bed along each respective bed side, a pair of elongated axially extending spindles having a length generally corresponding to the longitudinal length of the respective bed side, the lower side edges portion of the cover being coupled to an associated said spindle, a spindle guide assembly for support the spindles in vertical movement substantially over each respective bed side, the spindle guide assembly including, a first drive assembly being coupled to a first said spindle and selectively activatable to journal the spindle in rotational movement about the spindle axis to effect winding or unwinding of at least part of the cover thereabout, a first shuttle assembly including a carriage and a spindle support mounting the first drive assembly and first spindle in the retraction and extension of part of the cover over the respective spindle sides as the first spindle is rotated, a first guide track mounted on an associated said bulkhead, the first shuttle being coupled for movement along the first guide track with the first guide track including, a vertically track portion extending from a lower end spaced proximate to the bed upper surface, to an upper end spaced a vertical distance thereabove, and a displacement assembly being spaced towards the lower end, the displacement assembly engageable by the first shuttle assembly wherein engagement between the carriage and the displacement assembly effects selective lateral displacement of the spindle support to move the first spindle from a winding position, wherein said first spindle is located laterally outward relative to said respective bed side so as to be moveable to a vertically spaced position above the bed, and a storage position wherein said first spindle is moved laterally inwardly past the respective bed side to locate beneath the lower surface, the spindle being rotatable by the activation of the drive assembly to wind and retract the cover over the respective bed side whereby winding draws the carriage along the first guide track from engagement with the displacement assembly and along the vertical track portion to move the first spindle from the storage position and to a raised position with the carriage spaced towards the upper end, and whereby rotation of the spindle by the activation of the drive assembly to unwind and deploy the cover over the associated bed side portion is operable to move the first spindle from the raised position whereby the carriage moves downwardly along the vertically track portion and into re-engagement with the displacement assembly to reposition the spindle from the winding position to the storage position.

BRIEF DESCRIPTION OF THE DRAWINGS

Reference may now be had to the following detailed description taken together with the accompanying drawings in which:

FIG. 3 illustrates an enlarged partial perspective view A of the enclosure system shown in FIG. 2 in the initial deployment of the cover;

FIGS. 4, 5 and 6 illustrate the enlarged partial view shown in FIG. 3 illustrating the repositioning of the spindle end from a winding position to a storage position;

FIGS. 10, 11 and 12 illustrate the repositioning of the spindle shown in FIG. 9 from the winding position to the storage position; and FIGS. 13 to 15 illustrate schematically a retractable trailer enclosure system in accordance with a third embodiment of the invention, showing the repositioning of the spindle from a winding to a storage position.

DETAILED DESCRIPTION OF THE PREFERRED EMBODIMENTS

Figure 1:
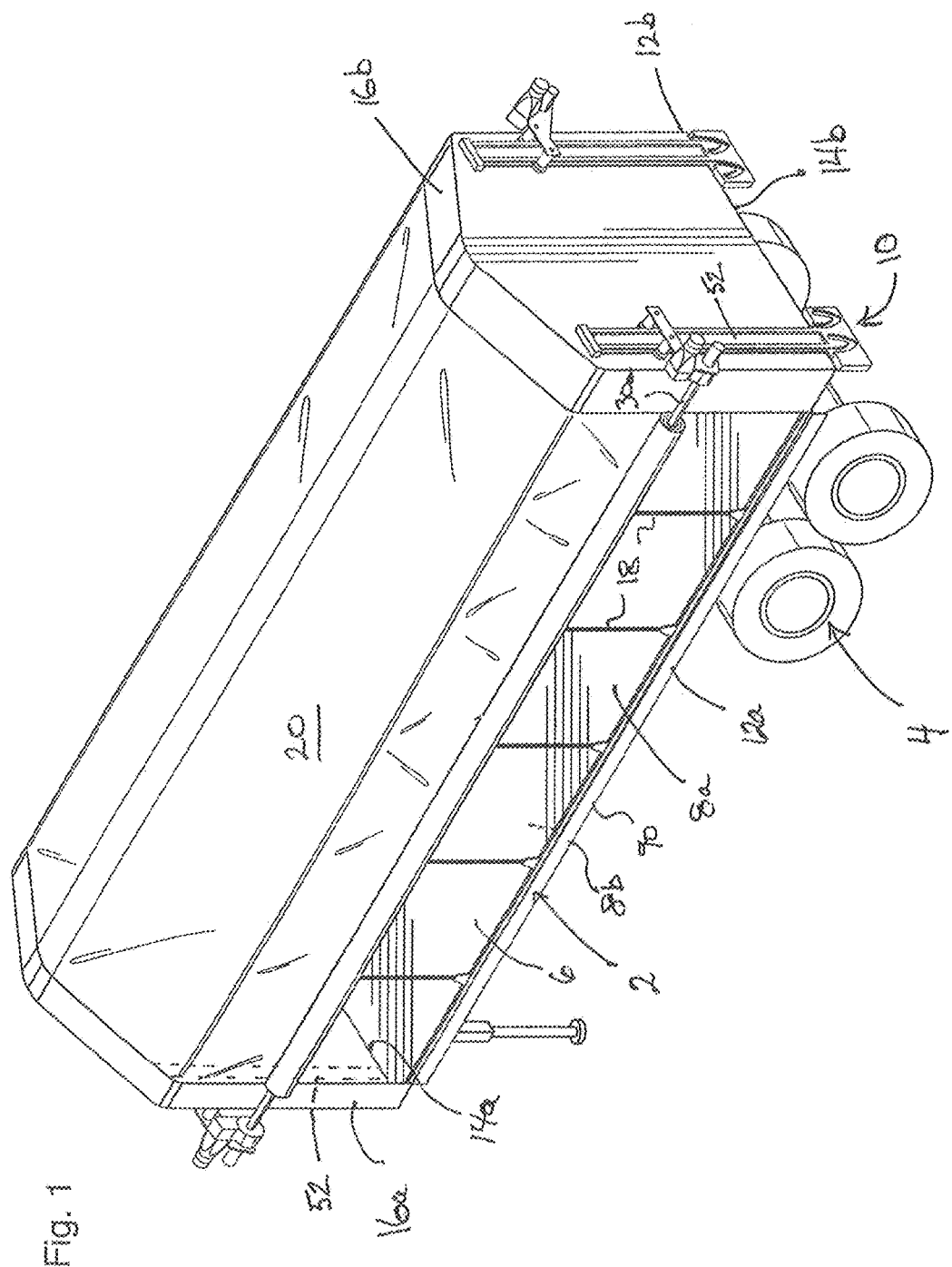
FIG. 1 illustrates a perspective view of a truck trailer having a retractable trailer enclosure system in accordance with a first embodiment of the invention, with the covering tarp in a partially retracted position.

Reference may now be had to FIG. 1 which illustrates a wheeled flatbed truck trailer 2 which as will be described, incorporates a retractable trailer enclosure system 10 in accordance with a preferred embodiment of the invention. The trailer 2 includes a conventional flat rectangular trailer bed 6 which is mounted to a sub-frame to which is secured to the trailer wheel assembly 4. The trailer bed is characterized by planar horizontal upper and lower bed surfaces 8a,8b, and which include parallel longitudinal sides 12a,12b and parallel forward and rearward lateral ends 14a,14b.

Front and rear bulkheads, 16a,16b are provided at each of the respective forward end 26a and rearward end 26b. Each of the bulkheads 16a,16b consist of a sheet metal panel secured to a 2" by 2" steel frame and extend vertically the lateral width of the trailer bed 6 to a respective uppermost edge. Optionally, a series of cover supporting bows 18 may be provided along the length of the trailer 2 spanning between the sides 12a,12b. The bulkheads 16a,16b and bows 18 are formed with a height selected having regard to the intended types of goods to be transported via the trailer 2 and most typically have a vertical height between about 6 and 8 feet.

FIG. 1 shows the enclosure system 10 used to cover or uncover the trailer bed 6 in the loading, transport and unloading of goods thereon.

The enclosure system 10 is shown best in FIG. 1 as including a flexible cover 20, a pair of axially extending spindles 30a,30b and a spindle guide assembly 40a,40b for supporting an associated spindle 30a,30b as it is moved in the retraction and deployment of the cover 20. In the enclosure system 10, the flexible tarpaulin or cover 20 has a longitudinal length and width selected to cover the trailer bed 6 when unfurled. More particularly, the cover 20 has a longitudinal length and lateral width selected whereby when fully unfurled and supported above the upper surface 8a of trailer bed 6 by the bows 18 and upper edges of the bulkheads 16a,16b, the longitudinal edges of the cover 20 extend vertically downwardly covering the trailer bed 6, and with each cover edge portion locating below the trailer bed lower surface 8b.

In the construction shown, cylindrical spindles 30a,30b are each elongated along a respective spindle axis $A_x$ and have a length corresponding to the adjacent trailer bed side 12a,12b. As will become apparent, the use of separate spindles 30a,30b advantageously allows the enclosure system 10 to permit access to the trailer bed 6 along either of its longitudinal sides 12a,12b. It is to be appreciated that in a less preferred construction, the enclosure system 10 could be provided with a single spindle 30 moveably supported by an associated single spindle guide assembly 40 and operable to permit access to the trailer 2 along one lateral side only.

In the embodiment shown in FIG. 1, each of the spindle guide assemblies 40a,40b are provided with the identical construction and are mounted in a mirror arrangement about the longitudinal centre of the truck trailer 2. The spindle 30a is secured to a first longitudinal edge portion of cover 20, with spindle 30b secured to the second opposite longitudinal edge portion. The longitudinal edges of the cover 20 may be secured to the spindles 30a,30b in a number of possible manners. In a simplified construction, the edges of the cover 20 are coupled to the spindles 30a,30b by the use of screws or other mechanical fasteners.

The spindle guide assemblies 40a,40b and their associated spindles 30a,30b may be independently operated to selectively retract or extend either side of the cover 20 depending upon which side of the trailer 2 is to be loaded or unloaded. For brevity, a spindle guide assembly 40b is described in detail hereafter in raising and lowering the spindle 30b in the retraction and extension of the cover 20 over the side 12b of the trailer bed. It is to be appreciated that the spindle 30a and spindle guide assembly 40a operate in the identical manner in the retraction or extension of the opposing cover edge, with like reference numerals used to identify like components.

The spindle guide assembly 40b is provided for supporting the spindle 30b in a substantially horizontal orientation generally parallel to the adjacent longitudinal side 12b of the trailer bed 6. The spindle guide assembly 40b supports the spindle 30b in both a winding position (shown in FIG. 4) where the spindle 30b is positioned laterally outward from the trailer bed side 12b such that rotation of the spindle 30b about its axis $A_x$ effects both a coiling and uncoiling of the edge portion of the cover 20 thereabout allowing the cover 20 to be rolled upwardly or lowered therewith; and a stowed or storage position shown in FIG. 6, where the spindle 30b is moved below the bed lower surface 8b and beneath the portion of the trailer bed 6 adjacent to the longitudinal side 12b.

Figure 2:
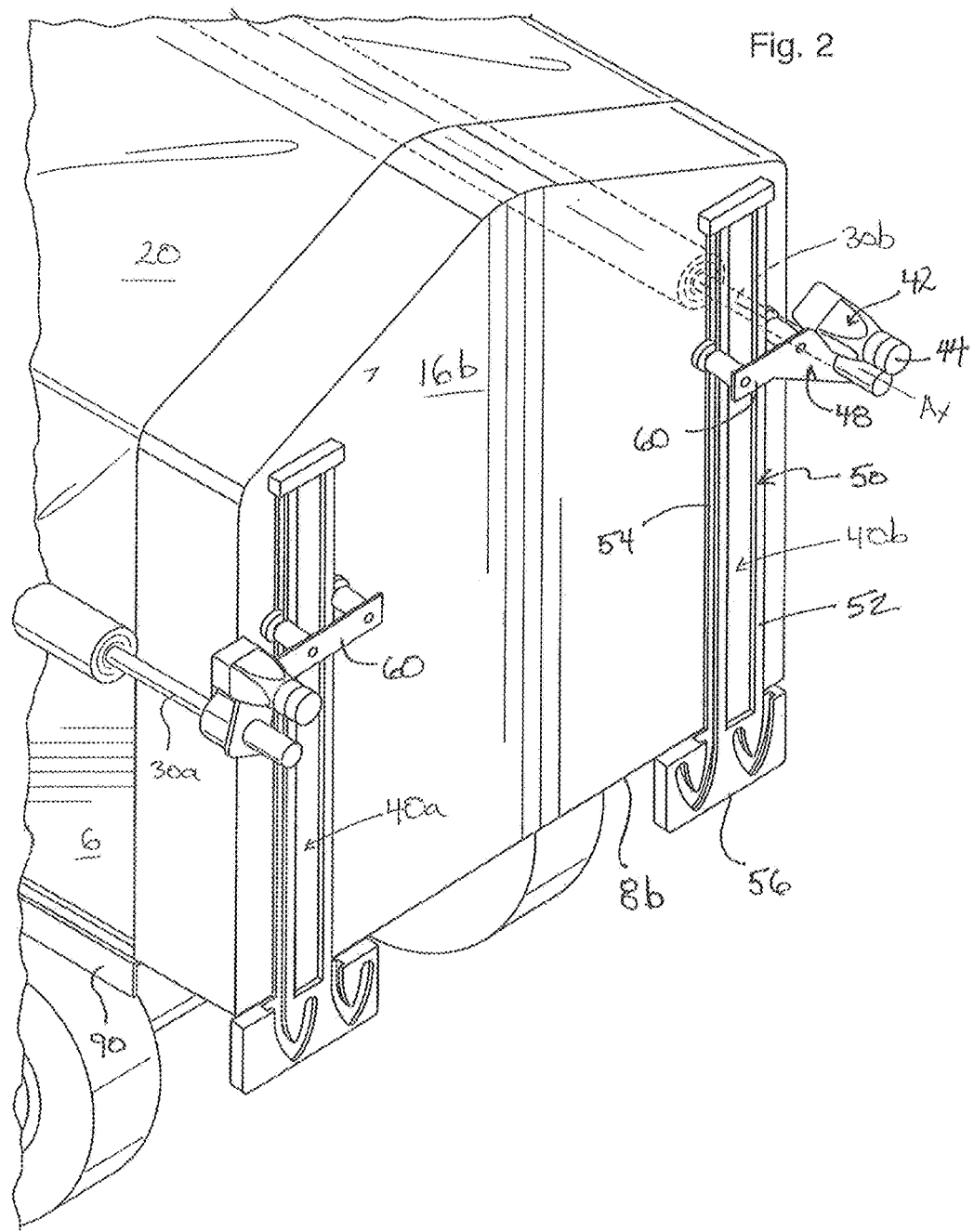
FIG. 2 shows an enlarged perspective view of the rear of the truck trailer shown in FIG. 1 illustrating the mounting of the trailer enclosure system thereon.

FIG. 2 illustrates the portion of the spindle guide assembly 40b supporting the rearwardmost end of the spindle 30b at the rear bulkhead 16b. It is to be appreciated that the opposite forward end of the spindle 30b is supported at the front bulkhead 16a in the identical manner. In this regard, the spindle guide assembly 40a includes a drive assembly 42 which is coupled to the spindle 30a, a shuttle assembly 48 and a guide track assembly 50.

The drive assembly 42 includes at least one electric drive motor 44 which is selectively operable to journal the spindle 30b in rotational movement about its axis $A_x$, and whereby such rotation effects the winding or unwinding of the cover 20 thereabout.

The shuttle assembly 48 mounts both the drive assembly 42 and the spindle 30b as the cover 20 is retracted or deployed over the longitudinal side 12b of the trailer bed 6. The guide track assembly 50 includes a pair of shuttle guides 52 which are positioned in a mirror arrangement on each of the front and rear bulkheads 16a,16b. FIG. 2 shows best the shuttle guide 52 mounted on bulkhead 16b as including a vertically elongated guide rail portion 54 and a spindle displacement assembly 56 for laterally repositioning the spindle 30b between the storage and winding positions.

The shuttle assembly 48 includes a pair of carriages 60 each having a spindle support arm 62 mounted thereto. Each carriage 60/spindle support arm 62 rotatably supports a respective end of the spindle 30b. The carriages 60 are engageable with the guide rail portion 54 and displacement assembly 56 of the associated shuttle guides 52. The carriage 60 is vertically moveable along the guide rail portion 54 together with the spindle 30b wherein the winding position, whereby winding of the cover 20 about the spindle 30a moves both the spindle 30a and the carriage 60 to a vertically raised position, spaced above the bed upper surface 8a to permit loading of the trailer 2 along the side 12b. Unwinding of the spindle 30b in turn, lowers both the carriage 60 and spindle 30b in sliding movement along the guide rail portion 54 and into engagement with the displacement assembly 56. The displacement assembly 56 is provided so that when engaged by the shuttle 60 as the cover 20 is deployed, the displacement assembly 56 repositions the spindle 30b from winding to storage positions.

FIGS. 3 to 6 provide a close up view of each spindle shuttle guide 52, and carriage 60/support arm 62 pair in a first preferred embodiment. The spindle guide 52 is provided with an elongated vertical guide rail portion 54 which extends vertically from a lower end and adjacent the lower surface 8b of the trailer bed 6 to the top of the trailer bed compartment adjacent the top of the bulkhead 16b. In FIG. 3 the vertical guide rail portion 54 travels along the rear surface of the rear bulkhead 16b and in close proximity to the lateral edge of the rear bulkhead. The guide rail portion 54 is preferably provided as a substantially elongate, flattened aluminum extrusion mounted directly to the rear bulkhead 16b. It is to be appreciated that the guide track assembly 50 includes a corresponding guide rail portion (not shown) mounted to the forward bulkhead 16a in a similar configuration and manner.

As shown best in FIG. 3 the guide rail portion 54 includes along each longitudinal edge a pair of parallel guide grooves 66a,66b which run vertically along each lateral side of the guide rail portion 54.

The carriage 60 is slideable along the length of the guide rail portion 54 and is coupled against removal therefrom via two connector bearings 68a,68b. The connector bearings 68a,68b are sized and designed so as to fit within respective grooves 66a,66b that run along each guide rail portion 54 edge. It is to be appreciated that while FIGS. 3 to 6 illustrate the carriage 60 as having connector bearings 68a,68b, the invention is not limited to the precise construction which is illustrated. In alternate configurations, the carriage 60 may be provided with one or more connector pins, flanges, wheels and/or combinations thereof and which are sized and positioned for sliding mated engagement with one or more grooves 66a,66b or flange provided along the guide rail portion 54. Preferably, the connector bearings 68a,68b are mounted on the carriage 60 with a horizontal distance therebetween which corresponds to the lateral width of the guide rail portion 54 such that each connector bearing 68a,68b slideably engages with each respective groove 66a,66b whilst limiting rotational movement of the shuttle 60 relative to the guide rail portion 54. The applicant has appreciated that by such an arrangement, the connector bearings 68a,68b advantageously act to limit any undesired rotational movement of the spindle 30b when in the winding position as it moves with the coiling and uncoiling of the cover 20 thereabout.

Figure 5:
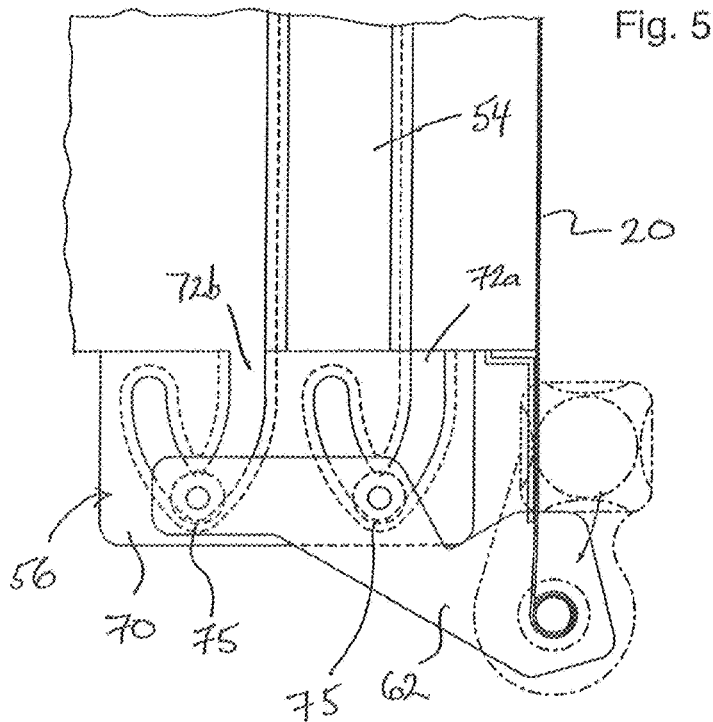
Figure 6:
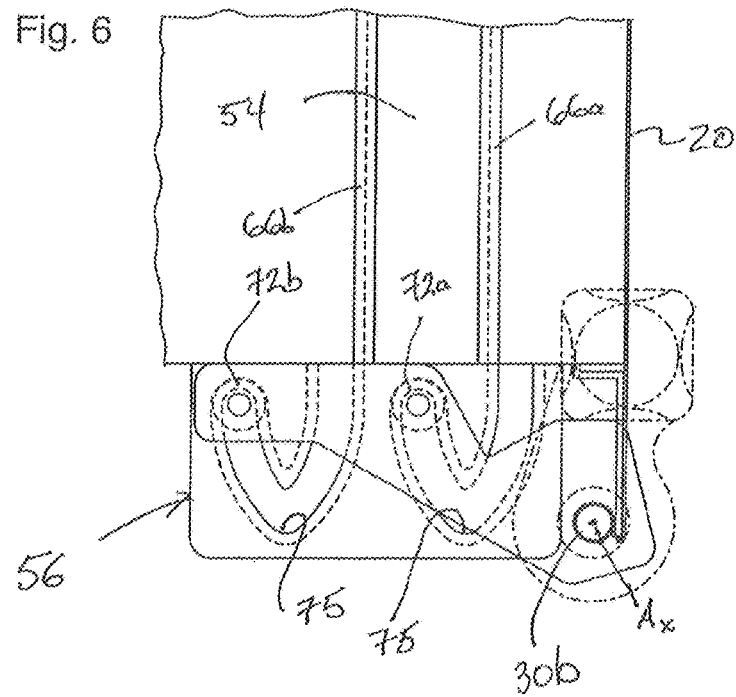
Figure 7:
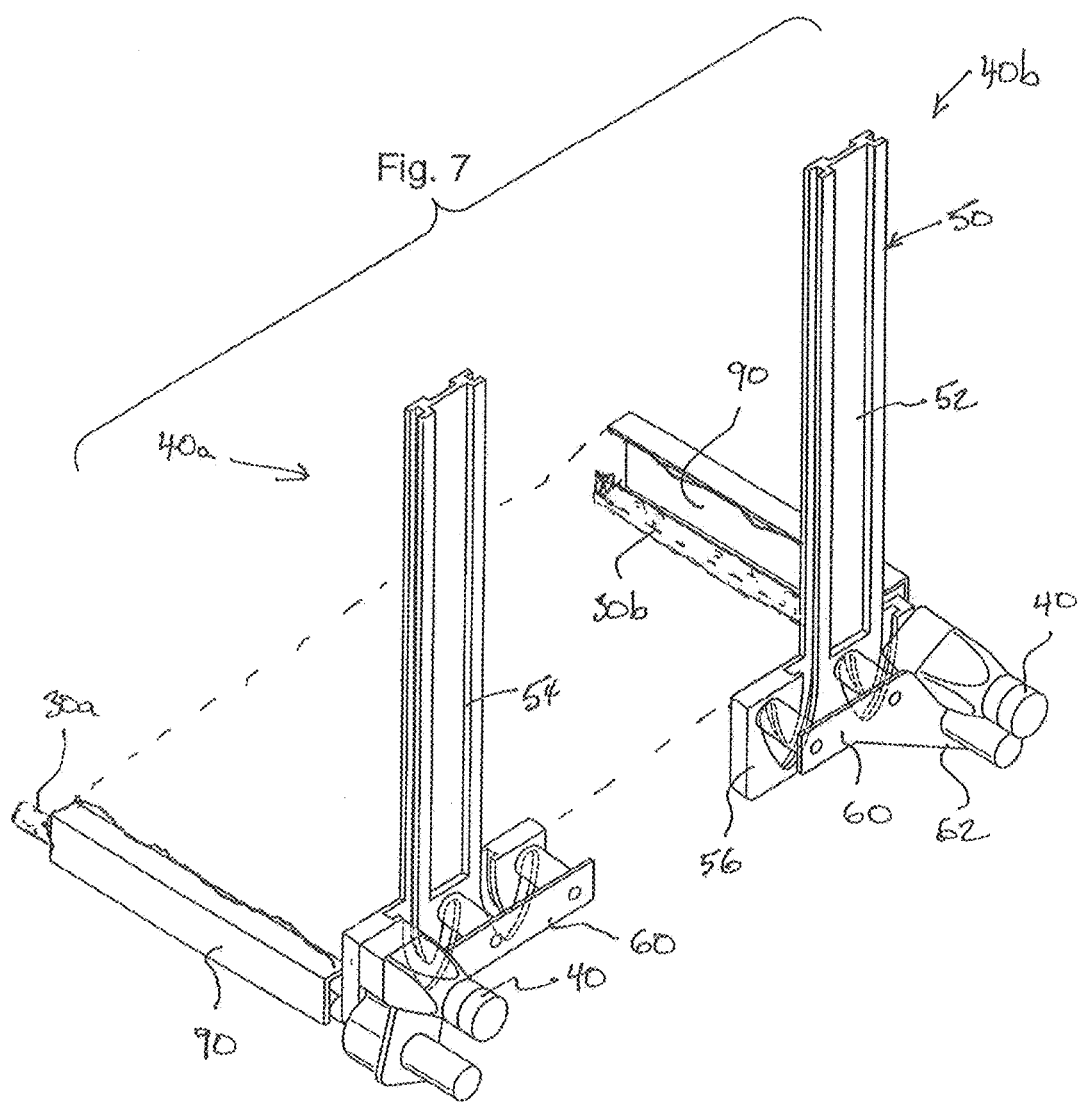
FIG. 7 illustrates a partial perspective view of the trailer enclosure system illustrated in FIG. 2 in isolation, illustrating the spindle repositioning in storage below the trailer bed.

Reference may be had to FIGS. 4 to 6 which illustrate the lateral displacement assembly 56 in accordance with the first embodiment of the invention. As with the guide rail portion 54, the guide track assembly 50 includes separate lateral displacement assemblies 56 positioned along each of the front and rear bulkheads 16a,16b. In FIG. 5, the displacement assembly 56 is shown best as including a guide plate 70. The guide plate is positioned immediately below the guide rail portion 54. The guide plate 70 includes two slotted U or J-shaped grooved slots or guide channel paths 72a,72b. The channel paths 72a,72b are sized and spaced to securely receive therein the connector bearings 68a,68b as the shuttle 60 is moved downwardly from guide rail portion 54 and into engagement with the displacement assembly 56.

Most preferably each of the channel paths 72a,72b are provided with an inwardly curving J-shaped channel which extend downwardly to a lower most bight 75. The top of each channel paths 72a,72b is aligned with a respective groove 66a,66b at the bottom of the vertical guide rail portion 54 such that the connector bearings 68a,68b seamlessly travel from the guide rail portion 54 and into and along each channel path 66a,66b.

As shown best in FIGS. 4 to 6, the channel paths 72a,72b extend downwardly and then laterally inwardly and upwardly. The carriage 60 is moveable along the channel paths 72a,72b to reposition the spindle 30b from the winding position shown in FIG. 5, where the spindle 30b is adjacent and laterally outwardly from the vertical place of the longitudinal side 12b of the trailer 2, and the storage position shown in FIG. 6 where the spindle 30b is moved beneath the lower bed surface 8b. Although not essential, the trailer 2 may further be provided with a downwardly extending sealing flange 90 projecting below the lower bed surface 8b along each longitudinal side 12a,12b. The flange 90 and lower bed surface 8b forming an associated storage pocket 100 sized to receive the associated spindle 30a,30b at least partially therein.

The spindle 30b is rotatably secured to the spindle support arm 62 (as shown in FIG. 4) so as to accommodate the winding and unwinding of the cover 20 onto the spindle 30b. The motor 44 is mounted on the spindle support arm 62 and selectively drives the spindle 30b in rotation about its axis $A_x$ so as to wind and unwind the cover 20 thereon.

In moving from extended winding to the storage position to deploy and extend the cover 20, the motor 44 is initially activated to rotate the spindle 30b in a first rotational direction so that the cover 20 uncoils. The uncoiling of the cover 20 allows the shuttle 60 to move downwardly with and the connector bearings 68a,68b sliding downwardly along the vertical guide rail portion 54 and into each associated channel path 72a,72b by the force gravity. Most preferably, the cover 20 has a width selected so that at the point the cover 20 is completely uncoiled from the spindle 30a, the connector bearings 68a,68b each locate at the lower most bight 75 of the guide paths 72a,72b in the position shown in FIG. 5. The rotation of the spindle 30b is continued in the same first direction, recoiling the cover 20 around the spindle 30b in the opposite orientation. The re-tensioning of the cover 20 pulls the connector bearings 68a,68b laterally inwardly and upwardly relative to the trailer side 12b along each guide path 72a,72b.

As the motor 44 winds the cover around the spindle 30b the tension in the cover 20 thus moves the shuttle 60 with the connector bearings 68a,68b along the guide channel paths 72a,72b on the guide plate 70, laterally repositioning the spindle 30 below the flange 90 and upwardly into the pocket 100 (as shown in FIG. 6). The rotation of the spindle 30b acts to retighten the cover 20 against the lower edge of the flange 90, to seal the cover 20 against the trailer side 12b in a labyrinthine-type seal arrangement.

When the cover 20 is fully retracted, the spindle 30b sits substantially at the height of the trailer bed compartment, allowing access to the trailer bed 6 along its side for loading or unloading or cargo (as shown in FIG. 1). In order to retract the cover 20, the motor 44 rotates the spindle 30b in the opposite second rotational direction. As the cover 20 unfurls, the force of gravity causes the carriage 60 to move downwardly and laterally outwardly as the connector bearings 68a,68b slide down the associated paths 72a,72b in the guide plate 70. When the connector bearings 68a,68b reach the bottom bight 75 of each "J" in the channel path 72a,72b, the cover 20 is again completely uncoiled from the spindle 30b. The power drive motor 44 continues to turn the spindle 30b in the same second winding direction, causing the cover 20 to coil around the spindle 30b in the opposite orientation. The tension in the cover 20 draws the connector bearings 68a,68b laterally outwardly and upwardly in travel along the grooved paths 72a,72b to the open end of the "J" and from the bight, moving the spindle 30b laterally outward back to the winding position, with the connector bearings 68a,68b reengaging the guide grooves 66a,66b of the vertical guide rail portion 54. With the claimed construction, when the connector bearings 68a,68b travel along the channel paths 72a,72b of the guide plate 70, the spindle 30b is positioned below the trailer bed 6. As the connector bearings 68a,68b move outwardly from the open ends of the "J"-shaped paths 72a,72b, the spindle 30b moves under and back up around a flange 90. Once repositioned in the winding position, its continued winding vertically raises the spindle 30b and carriage 60 as the cover 20 is coiled thereabout.

Figure 8:
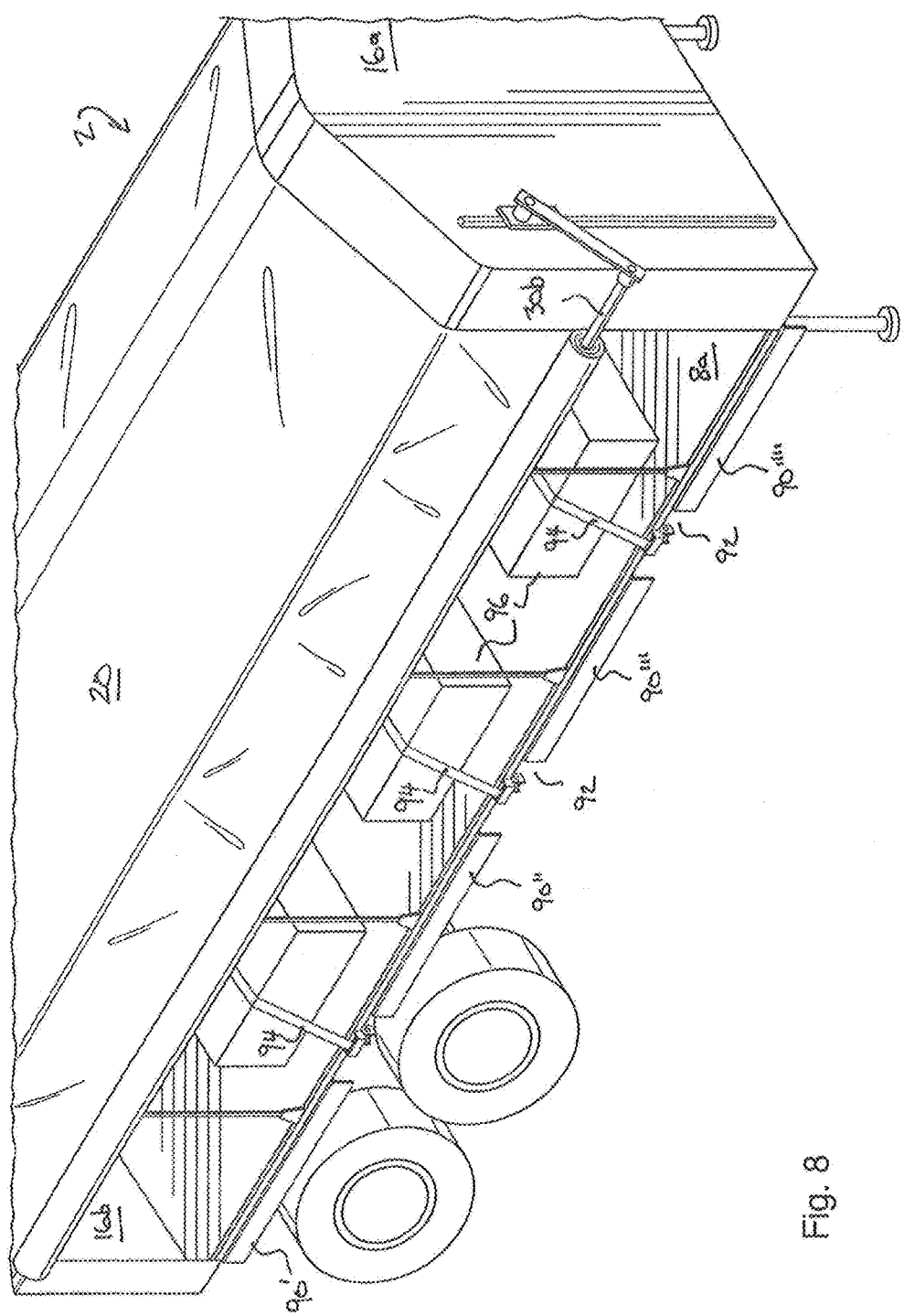
FIG. 8 illustrates a partial perspective view of the retractable trailer enclosure system in accordance with a second embodiment of the invention.
Figure 9:
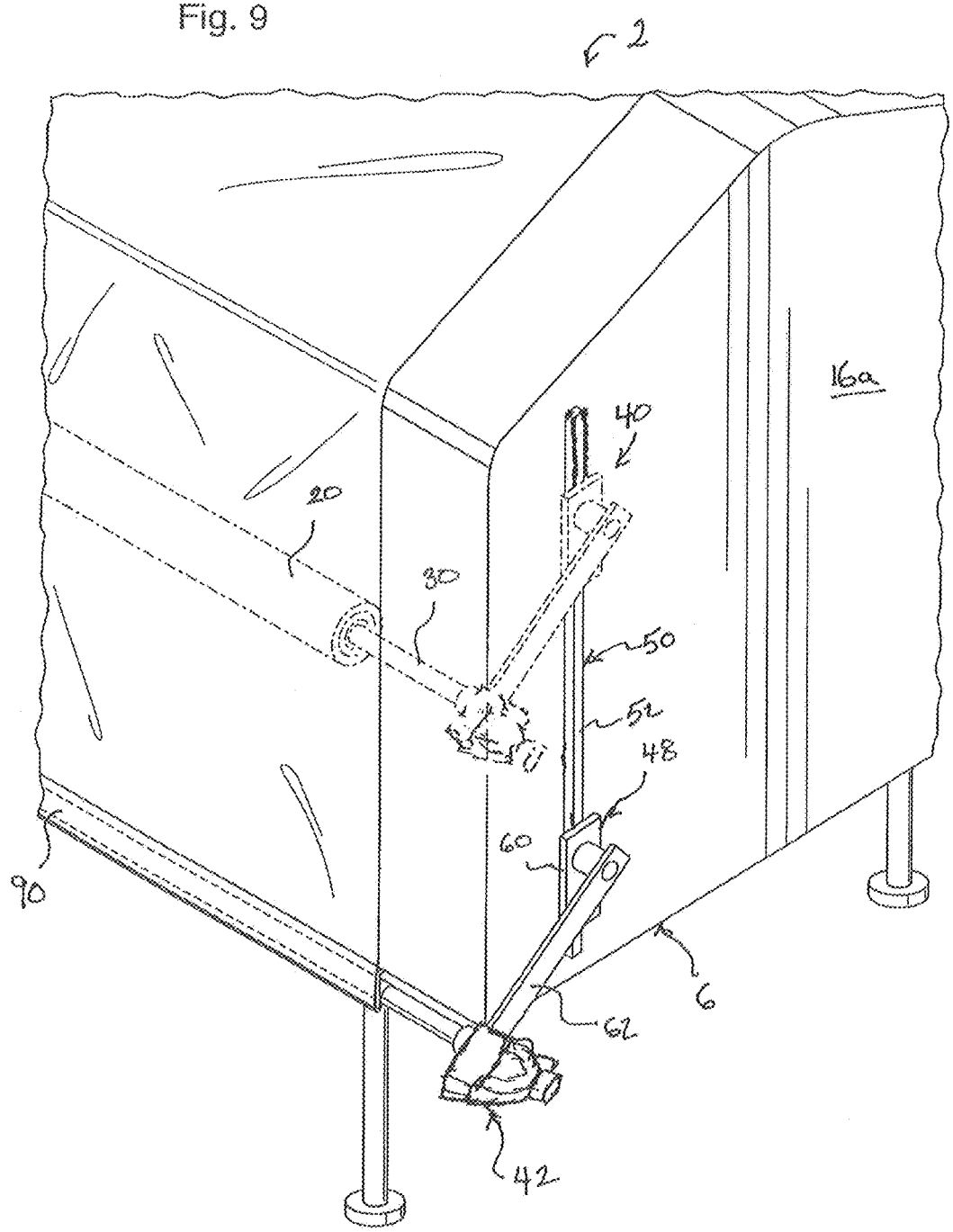
FIG. 9 illustrates the retractable trailer enclosure system of FIG. 8 illustrating the repositioning of the spindle from a winding to a storage position.

Although FIG. 1 illustrates the trailer 2 as having flanges 90 which extend along the entire longitudinal length of the trailer sides 12a,12b, the invention is not so limited. FIG. 8 illustrates an alternate embodiment of the invention wherein like reference numerals may be used to identify like component. In FIG. 8, the flange is provided as a series of flange segments 90',90'',90''', 90''''. There is a gap 92 between each adjacent flange segment 90',90'',90''',90'''' which allows straps 94 for securing cargo 96 to the trailer bed 6 to more readily pass between the lateral edge of the trailer bed 6 and the cover 20.

Although FIGS. 2 to 7 illustrate the shuttle guide 52 as including a vertical guide rail portion 54 and guide plate 70 with edge guide grooves 66 and guide paths 72 respectively, the invention is not so limited. It is to be appreciated that the guide rail portion 54 and guide plate 70 could be provided with a number of different flange, slot and/or groove arrangements which are configured to slideably engage guiding elements on the shuttle assembly carriages 60.

FIGS. 8 to 12 which illustrate a flatbed trailer 2 having a trailer enclosure system 10 in accordance with a further embodiment of the invention, wherein like reference numerals are used to identify like components. As with the embodiment shown in FIG. 1, the trailer enclosure system 10 includes a spindle 30 which extends along longitudinal side 12 of the trailer bed 6. The enclosure system 10 is provided with a flexible cover 2. By the selective winding of the cover 20, the spindle 30 is movable between the storage positioned shown in solid lines located beneath the edge of the trailer bed 6, and the winding position shown in phantom, where the coiling of the cover 20 about the spindle 30 raises the spindle 30 to permit access to the trailer bed 6.

The enclosure system further includes a spindle guide assembly 40 having a drive assembly 42, shuttle assembly 48 and guide track assembly 50. The shuttle assembly 48 includes a carriage 60 to which the spindle support arm 62 is pivotally mounted, and which is guided in movement along an associated shuttle guide 52. FIG. 8 illustrates a single shuttle guide 52, carriage 60 and spindle support arm 62 supporting the forward end of the spindle 30. For clarity, it is to be appreciated that the rearward end of the spindle 30 is moveably supported by a carriage 60/spindle support arm 62 pair and shuttle guide 62 in the identical manner.

As shown best in FIGS. 9 to 12, in the illustrated embodiment the guide rail portion 54 of the shuttle guide 52 is provided as a vertically extending T-shaped metal rail which projects upwardly from a lower end positioned immediately above the upper surface 8a of the trailer bed 6 to an upper end. The displacement assembly 56 is provided with a stop member 106 which operates in conjunction with a pivot bearing 108 used to hingedly mount the spindle support arm 62 to the carriage 60.

As shown best in FIGS. 10 and 11, the carriage 60 coupled to the T-shaped guide rail portion 54 by way of a low friction slide bearing 110. The slide bearing 110 may for example comprise a low friction polymer and is selected to securely couple the carriage 60 to the T-shaped guide rail portion 54 so as to be longitudinally slideable therealong between a raised position, where the coiling of the cover 20 about the spindle 30 raises the cover 20 to allow bed access, and a lowered position shown FIG. 11 where the carriage 60 is moved downwardly into engagement against the stop member 106.

The pivot bearing 108 is selected so that as the carriage 60 is moved against the stop member 106, the weight of the spindle 30 and motor 44 carried on the spindle support arm 62 effects the downward and inward rotation of the spindle 30 beneath the flange 90 in the direction of arrow 200.

Most preferably, the pivot bearing 108 is provided as a Rosta™ or other suitable spring bearing. The spring force is selected to resiliently bias the spindle 30 to a neutral position substantially midway between the winding and storage positions, and whereby tension supplied by winding the cover 20 from the fully extended position moves the spindle 30 laterally inwardly or outwardly. The displacement assembly 56 thus operates with the cover winding to move the spindle 30 position shown in FIG. 10 by the application of an upward force by the cover 20. In particular, as the cover 20 is fully unwound, the weight of the spindle 30 and motor 44 being selected to overcome the resilient spring force of the pivot bearing 108, allowing the spindle support arm 62 to rotate about the pivot bearing 108 and move toward the neutral position. Continued cover winding further moves the spindle 30 beneath the lower surface 8b of the trailer bed 6 wherein continued spindle rotation rewinds the cover 20 tensioning it against the flange 90.

Alternately, the pivot bearing 108 may be selected to resiliently bias the spindle 30 fully beneath the flange 90 towards the storage position. In such a configuration, continued winding of the cover 20 from the fully unwound position remotely in the carriage 60 sliding upwardly along the guide rail portion 54, as the cover 20 is re-wound about the spindle 30.

Reference may be had to FIGS. 13 to 15 which illustrate the winding motor 44 and shuttle guide 52 of a spindle guide assembly 40 used in an enclosure system 10 in accordance with a further embodiment of the invention, wherein like reference numerals are used to identify like components. The spindle guide assembly 40 includes a guide track assembly 50 and shuttle assembly 48 adapted to support each of the ends of a spindle 30 in a generally horizontal arrangement as the cover 20 is extended in deployment or retracted.

Again for clarity, a single carriage 60 having a spindle support arm 62 used to rotatably support a first end of the spindle 30 is shown. It is to be appreciated that in a preferred construction, both spindle ends are supported in similar manner as the spindle 30 is journaled in rotation in its retraction and deployment. In the embodiment shown in FIGS. 13 to 14, the vertical guide rail portion 54 is provided as a tubular rod. The tubular rod 50 runs vertically along the back surface of each bulkhead. The tubular rod 50 extends from the near top of the bulkhead to the upper surface 8a of the trailer bed 6. The displacement assembly 56 shown in the embodiment of FIG. 13 incorporates a J-shaped rod extension 114 which extends below the lower surface 8b contiguously with the end of the guide rail portions 54 and which is co-operable with a pivot bearing 116 used to hingedly couple the spindle support arm 62 to the carriage 60.

As shown in phantom in FIG. 13, the carriage 60 is coupled for movement along the guide rail potion 54 and J-shaped extension 114 by way of three connecting roller wheels 120a,120b,120c.

The connecting wheels 120a,120b,120c that are arranged so as to slideably engage with the rod of the guide rail portion 54 and J-shaped extension 114. The connecting wheels 120a,120b,120c are arranged on the carriage such that a first connecting wheel 120a is oriented to engage with the outside edge of the tubular guide rail portion 54; a second connecting wheel 120b is located below the first connecting wheel 120a; and a third connecting wheel 120c is oriented to engage with the inside edge of the guide rail portion 54 between the wheels 120a,120b. When the wheels 120a,120b,120c are so engaged, the carriage 60 is able to securely slide along the guide rail portion 54 and into engagement with the J-shaped extension 114, whilst being coupled against removal therefrom.

The spindle 30 is rotatably mounted on the spindle mounting arm 62 allowing the spindle 30 to rotate with the operation of the drive motor 44 so as to wind and unwind the cover 20 thereabout. The drive 44 is mounted on the spindle mounting arm 62 for movement therewith.

As the power motor 44 rotates the spindle 30 so as to wind the cover 20 around the spindle 30 the tension in the cover 20 causes the carriage 60 to slide upwards along the guide rail portion 54. When the cover 20 is fully retracted, the spindle 30 is positioned at or near the top of the trailer bed compartment, allowing access to the trailer bed 6.

As shown in FIG. 13, the motor 44 rotates the spindle 30 in the opposite direction in order to re-extend the cover 20. As the cover 20 is unfurled, the force of gravity pulls the spindle mounting arm 62 and carriage 60 downwards along the guide rail portion 54 into engagement with the J-shaped extension 114. When the carriage 60 reaches the J-shaped extension 114, the spindle 30 is guided under and around the flange 90 extending vertically from the trailer bed 6 by the rotational movement of the carriage 60 as it travels along the curving portion of the extension 114. Concurrently, the winding of the cover 20 causes it to be rewound about the spindle 30, drawing the spindle 30 upwardly about the pivot 16. The resulting relative pivotal movement of the support arm 62 about the pivot 116, moves the spindle 30 laterally inwardly and upwardly creating a seal between the cover 20 and the flange 90.

In particular, as shown best in FIGS. 14 and 15, as the connecting wheels 120a,120b,120c travel along the J-shaped extension 114 the carriage 60 rotates in a clockwise direction. This initial movement results in the spindle 30 initially moving in the direction of arrow 200 below the flange 90 as it is initially fully unwound. Continued winding of the cover 20 about the spindle 30 and the movement of the connecting wheels 120a,120b,120c results in the rewinding of the cover 20 about the spindle 30 and its movement upwardly in the direction of arrow 220 into the storage position shown in FIG. 15. Continued winding of the cover 20 effects the tensioning of the cover against the flange 90.

While the preferred embodiments illustrate the guide track assembly 50 as having a guide rail portion 54 which extends vertically along the trailer bulkheads 16, the invention is not so limited. It is to be appreciated that in an alternate configuration, the guide rail portion 54 could be provided in a curved or inclined orientation, as for example tilted outwardly at an angle of between 5 and 15°, to facilitate the upward movement of the spindle 30 as the diameter of the coiled portion of the cover 20 wound thereabout increases.

Although the preferred embodiment of the invention describes the retractable trailer enclosure system 10 as being used with a flatbed trailer 2, the invention is not so limited. It is to be appreciated that the tarp enclosure system may be used with a number of different trailer configurations where the vertical retraction of a flexible tarp, cover, straps, or mesh along one or both sides of the trailer is desired.

Although the detailed description describes and illustrates the various preferred embodiments, the invention is not so limited. Many modifications and variations will now occur to persons skilled in the art. For a definition of the invention, reference may be had to the appended claims.

We claim:

1. A vehicle trailer comprising a wheel mounted trailer bed and a retractable trailer enclosure system for selectively covering or uncovering part of the trailer bed,
the trailer bed having upper and lower surfaces and including longitudinally extending bed sides and laterally extending bed ends, a trailer bulkhead positioned proximate to each trailer end,
the enclosure system comprising,
a cover support spaced vertically a distance about an upper surface of the bed,
a flexible cover having a longitudinal length substantially corresponding to a longitudinal length of the bed sides, and a width selected whereby with the cover in a fully extended orientation supported by the at least one cover support, the cover extends vertically downwardly to cover the upper surface of the bed sides with lower side edge portions of the cover extending beneath the lower surface of the bed along each respective bed side,
a pair of elongated axially extending spindles having a length generally corresponding to the longitudinal length of the respective bed side, the lower side edges portion of the cover being coupled to an associated said spindle,
a spindle guide assembly for support the spindles in vertical movement substantially over each respective bed side, the spindle guide assembly including,
a first drive assembly being coupled to a first said spindle and selectively activatable to journal the spindle in rotational movement about the spindle axis to effect winding or unwinding of at least part of the cover thereabout,
a first shuttle assembly including a carriage and a spindle support mounting the first drive assembly and first spindle in the retraction and extension of part of the cover over the respective spindle sides as the first spindle is rotated,
a first guide track mounted on an associated said bulkhead, the first shuttle being coupled for movement along the first guide track with the first guide track including,
a vertically track portion extending from a lower end spaced proximate to the bed upper surface, to an upper end spaced a vertical distance thereabove, and
a displacement assembly being spaced towards the lower end, the displacement assembly engageable by the first shuttle assembly wherein engagement between the carriage and the displacement assembly effects selective lateral displacement of the spindle support to move the first spindle from a winding position, wherein said first spindle is located laterally outward relative to said respective bed side so as to be moveable to a vertically spaced position above the bed, and a storage position wherein said first spindle is moved laterally inwardly past the respective bed side to locate beneath the lower surface,
the spindle being rotatable by the activation of the drive assembly to wind and retract the cover over the respective bed side whereby winding draws the carriage along the first guide track from engagement with the displacement assembly and along the vertical track portion to move the first spindle from the storage position and to a raised position with the carriage spaced towards the upper end, and
whereby rotation of the spindle by the activation of the drive assembly to unwind and deploy the cover over the associated bed side portion is operable to move the first spindle from the raised position whereby the carriage moves downwardly along the vertically track portion and into re-engagement with the displacement assembly to reposition the spindle from the winding position to the storage position.

2. The retractable trailer enclosure as claimed in claim 1, wherein the vertically extending guide rail portion comprises a plurality of vertically guide channels,
the carriage including a plurality of guide wheels or bearings which are moveably engageable with an associated said vertical guide channel.

\* \* \* \* \*